United States Patent [19]
Kamiya et al.

[11] 3,873,526
[45] Mar. 25, 1975

[54] DIAZA-OXA-BICYCLODECANE DERIVATIVES AND PRODUCTION THEREOF

[75] Inventors: Takashi Kamiya, Suita; Shizuo Maeno, Osaka; Masahi Hashimoto, Toyonaka, all of Japan

[73] Assignee: Fujisawa Pharmaceutical Co. Ltd., Osaka, Japan

[22] Filed: Aug. 30, 1973

[21] Appl. No.: 392,944

[30] Foreign Application Priority Data
Sept. 8, 1972 Japan.............................. 47-90675

[52] U.S. Cl............ 260/239.3 B, 424/244, 424/250
[51] Int. Cl. ...................... C12d 13/00, C07d 99/02
[58] Field of Search ............................ 260/239.3 B Primary Examiner—Henry R. Jiles
Assistant Examiner—Robert T. Bond

[57] ABSTRACT

Diaza-oxa-bicyclodecane derivatives of the formula:

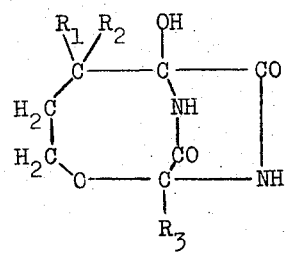

wherein $R_1$ and $R_2$ are linked together to form methylene, or $R_1$ is hydrogen and $R_2$ is methyl; and $R_3$ is formyl, hydroxymethyl, $-CH(OH)-C(OH)(CH_3)-CH_2OH$ or $-CH(OH)OR_4$ wherein $R_4$ is hydrogen or lower alkyl group, which are useful as a medicine having antimicrobiological activities or as an intermediate for preparing compound having pharmaceutical activities against microorganisms.

7 Claims, No Drawings

DIAZA-OXA-BICYCLODECANE DERIVATIVES AND PRODUCTION THEREOF

This invention relates to new diaza-oxa-bicyclodecane derivatives which are active against microorganisms or useful as an intermediate for preparing a pharmaceutical compound having antimicrobiological activity, and to production thereof.

Accordingly, the present invention provides, as novel compounds, diaza-oxa-bicyclodecane derivatives of the formula:

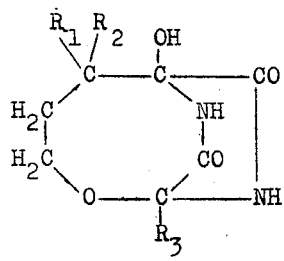

wherein $R_1$ and $R_2$ are linked together to form methylene, or $R_1$ is hydrogen and $R_2$ is methyl; and $R_3$ is formyl, hydroxymethyl,

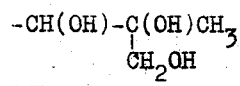

or $-CH(OH)OR_4$ wherein $R_4$ is hydrogen or lower alkyl group, with the proviso that when $R_3$ is $-CH(OH)-C(OH)(CH_3)-CH_2OH$, $R_1$ is hydrogen and $R_2$ is methyl.

In the above definition, the suitable example of lower alkyl group may be a lower alkyl group having 1 to 6 carbon atoms, such as methyl, ethyl, propyl, isopropyl, butyl, isobutyl, t-butyl, pentyl, hexyl, cyclohexyl or the like.

As mentioned in the above general formula, the compounds included in the present invention may be specifically divided into four types of compounds as illustrated below.

A: Dihydrobicyclomycin

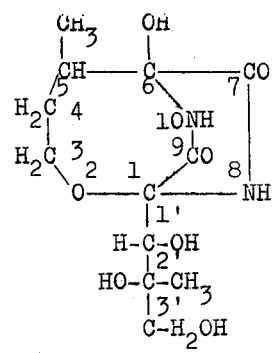

8,10-diaza-6-hydroxy-5-methyl-1-(2'-methyl-1', 2', 3'-trihydroxypropyl)-2-oxa-bicyclot[4,2,2]decan-7,9-dione B: 8,10-diaza-1-formyl-6-hydroxy-5-methylene-2-oxa-bicyclo[4,2,2]decan-7,9-dione

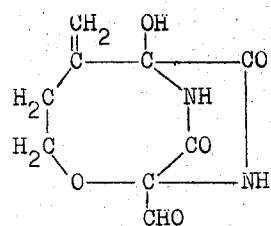

C: Acetals of 8,10-diaza-1-formyl-6-hydroxy-5-methylene-2-oxa-bicyclo[4,2,2]decan-7,9-dione

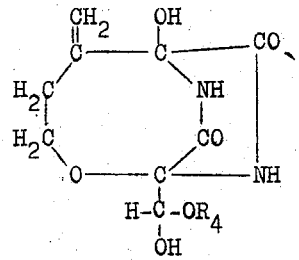

wherein $R_4$ is hydrogen or a lower alkyl group.

D: 8,10-diaza-1-hydroxymethyl-6-hydroxy-5-methyl-2-oxa-bicyclo[4,2,2]decan-7,9-dione

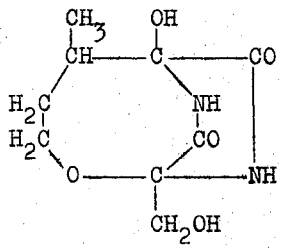

The aforementioned four types of compounds can be prepared according to methods as illustrated below, respectively.

Dihydrobicyclomycin

The dihydrobicyclomycin is prepared by reducing bicyclomycin and the process is illustrated in the following scheme:

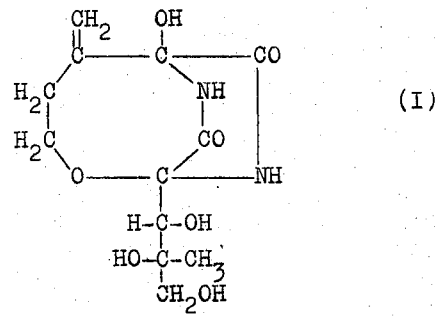

(Bicyclomycin)

↓ Reduction (I)

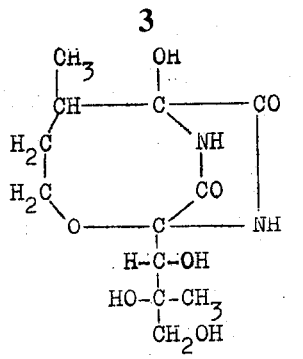

(Dihydrobicyclomycin)

The bicyclomycin (I) to be used as a starting compound in this reaction is known as WS-4545 substance by German Offenlegungsschrift 2150593 and can be prepared by a method as disclosed in the said publication.

In this reaction, the reduction is conducted by a conventional method, for example, by means of catalytic reduction, reduction with a metal and an acid [e.g. a metal such as iron, tin or zinc and acid such as an inorganic acid (hydrochloric acid, sulfuric acid or the like) or an organic acid (acetic acid or the like)]; an alloy, a metal, or its salt and water, alkaline or alcohol [e.g. an alloy, a metal or its salt such as sodium amalgam, aluminum amalgam, zinc, iron or ferrous salts and water, alkaline or alcohol such as methanol, ethanol, propanol or butanol]; a phenyl hydrazine or hydrazine; titanium chloride and hydrochloric acid, or electrolytic reduction.

As suitable examples of catalyst in the above catalytic reduction method, there may be, for example, platinum catalyst such as platinum plate, spongy platinum, platinum black, platinum colloid, platinum oxide or platinum wire; palladium catalyst such as palladium spongy, palladium black, palladium oxide, palladium on charcoal or palladium colloid; platinum group metal catalyst such as iridium, iridium colloid, ruthenium oxide, rhodium colloid or rhodium on alumina; nickel catalyst such as reduced nickel, nickel oxide or Raney nickel; cobalt catalyst such as reduced cobalt or Raney cobalt; iron catalyst such as reduced iron or Raney iron; or copper catalyst such as reduced copper, Raney copper or Ullmann copper.

The reduction is usually carried out in an inert solvent. The reaction conditions, for example, solvent to be used and reaction temperature, could be decided in accordance with the used reduction method. In general, it is preferable to employ a solvent such as water, methanol, ethanol, dimethylformamide, dimethylacetamide dioxane or the like.

The reduced compound i.e. dihydrobicyclomycin (II), can be isolated and purified by a conventional method.

The dihydrobicyclomycin (II), obtained by the method of this invention, is useful as medicines having antimicrobiological activities against microorganism such as *Escherichia coli*, *Salmonella typhosa*, *Shigella flexneri*, etc. and is also useful as an intermediate for preparing compound having pharmaceutical activities against microorganisms.

8,10-diaza-1-formyl-6-hydroxy-5-methylene-2-oxa-bicyclo[4,2,2]decan-7,9-dione 8,10-diaza-1-formyl-6-hydroxy-5-methylene-2-oxa-bicyclo [4,2,2]decan-7,9-dione (IV) is prepared by oxidizing bicyclomycin (I) or its mono acyl derivative, and the process is illustrated in the following scheme:

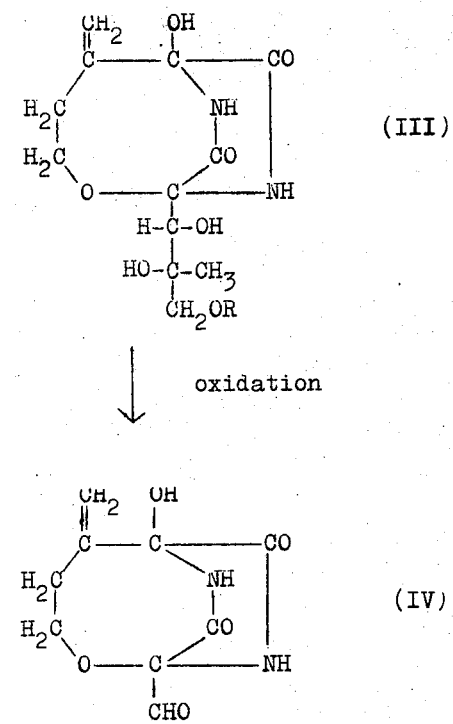

wherein R is hydrogen or an acyl group.

The suitable example of an acyl group may be alkanoyl group having 2 to 20 carbon atoms, such as acetyl, propionyl, butyryl, isobutyryl, valeryl, isovaleryl, pivaloyl, 2-ethylbutyryl, caproyl, heptanoyl, octanoyl, decanoyl, palmitoyl or stearoyl; alkenoyl having 2 to 20 carbon atoms, such as acryloyl, meta-acryloyl, crotonoyl, oleoyl, linoleoyl or linolenoyl; aryloyl, such as benzoyl, toluoyl, xyloyl or naphthoyl; aralkanoyl such as phenylacetyl or phenylpropionyl; aralkenoyl such as cinnamoyl; heterocyclic ring carbonyl, such as nicotinoyl, isonicotinoyl, 2-furoyl, 2-thenoyl, benzofuroyl or benzothenoyl; aliphatic hydrocarbon carbonyl (e.g. alkanoyl or alkenoyl) substituted by said heterocyclic ring or benzene-fused heterocyclic ring such as 1H(or 2H) tetrazolylacetyl, thienylacetyl, furylacetyl, 3-benzothiazolylacetyl, 2-oxo-3-benzothiazolylacetyl or 5-chloro-2-oxo-3-benzothiazolinylacetyl.

The above mono-acyl ester of bicyclomycin to be used as a starting material in this reaction is known as a mono acyl ester of WS-4545 substance by German Offenlegungsschrift 2150593 and can be prepared by a method as disclosed in the said publication.

The oxidation is carried out by a conventional method, for example, by treating bicyclomycin (I) or its mono acyl derivatives with a oxidizing agent such as, periodic acid or its salt (e.g. sodium salt, potassium salt etc), lead tetraacetate or the like.

The reaction solvent to be used should be decided in accordance with the oxidizing agent used. For instance, when periodic acid or its salt is used, the reaction is carried out in an inert solvent such as water, methanol ethanol or the like. When lead tetraacetate is used, the reaction is carried out, preferably under anhydrous condition, in an inert solvent such as acetic acid, benzene, tetrahydrofuran or other organic solvent inert to this reagent.

The reaction temperature is not especially limited and the reaction is usually carried out under cooling, at room temperature or at an elevated temperature.

The object compound (IV) is isolated and purified by a conventional method.

8,10-diaza-1-formyl-6-hydroxy-5-methylene-2-oxa-bicyclo [4,2,2]decan-7,9-dione (IV), obtained by the method of this invention, is useful as an intermediate for preparing compound having pharmaceutical activities against microorganisms.

Acetals of 8,10-diaza-1-formyl-6-hydroxy-5-methylene-2-oxa-bicyclo [4,2,2]decan-7,9-dione Acetals of 8,10-diaza-1-formyl-6-hydroxy-5-methylene-2-oxa-bicyclo[4,2,2]decan-7,9-dione are prepared by treating 8,10-diaza-1-formyl-6-hydroxy-5-methylene-2-oxa-bicyclo[4,2,2]decan-7,9-dione (IV) with an alkanol, and the process is illustrated in the following scheme:

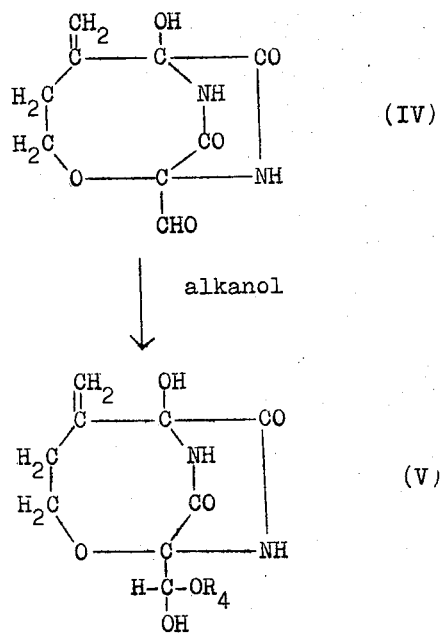

wherein $R_4$ is hydrogen or a lower alkyl group.

The suitable example of an alkanol may be an alkanol having 1 to 6 carbon atoms, such as methanol, ethanol, propanol, butanol or the like.

The reaction is carried out by a conventional method, i.e. in an alkanol such as methanol, ethanol, propanol, butanol or the like at room temperature.

The object compound is isolated and purified by a conventional method.

In a similar manner as mentioned above, hydrate of 8,10-diaza-1-formyl-6-hydroxy-5-methylene-2-oxa-bicyclo[4,2,2]decan-7,9-dione (V) is also prepared by treating the compound (IV) with water.

Acetals of 8,10-diaza-1-formyl-6-hydroxy-5-methylene-2-oxa-bicyclo[4,2,2]decan-7,9-dione (V), obtained by the method of this invention, are useful as an intermediate for preparing compound having pharmaceutical activities against microorganisms.

8,10-diaza-1-hydroxymethyl-6-hydroxy-5-methyl-2-oxa-bicyclo[4,2,2]decan-7,9-dione 8,10-diaza-1-hydroxymethyl-6-hydroxy-5-methyl-2-oxa-bicyclo[4,2,2]decan-7,9-dione (VII) is prepared by reducing 8,10-diaza-1-formyl-6-hydroxy-5-methylene-2-oxa-bicyclo[4,2,2]decan-7,9-dione (IV) or its acetals (V), and the process is illustrated in the following scheme:

wherein $R_5$ is formyl or $-CH(OR_4)OH$ wherein $R_4$ is hydrogen or lower alkyl group having 1 to 6 carbon atoms.

In this reaction, the reduction is conducted by a conventional method, for example, catalytic reduction, reduction with a metal and an acid [e.g. a metal such as iron, tin or zinc and acid such as an inorganic acid (hydrochloric acid, sulfuric acid or the like) or an organic acid (acetic acid or the like)]; an alloy, a metal or its salt, and water, alkaline solution or alcohol [e.g. an alloy, a metal or its salt such as sodium amalgam, aluminum amalgam, zinc, iron or ferrous salt and water, alkaline solution or alcohol such as methanol, ethanol, propanol or butanol]; titanium chloride and hydrochloric acid; or electrolytic reduction.

As suitable examples of catalyst in the above catalytic reduction method, there may be, for example, platinum catalyst such as platinum plate, spongy platinum, platinum black, platinum colloid, platinum oxide or platinum wire; palladium catalyst such as palladium spongy, palladium black, palladium oxide, palladium on charcoal or palladium colloid; platinum group metal catalyst such as iridium, iridium colloid, ruthenium oxide, rhodium colloid or rhodium on alumina; nickel catalyst such as reduced nickel, nickel oxide or Raney nickel; cobalt catalyst such as reduced cobalt or Raney cobalt; iron catalyst such as reduced iron or Raney iron; copper catalyst such as reduced copper, Raney copper or Ullmann copper.

The reduction is usually carried out in an inert solvent. The reaction conditions, for example, solvent to be used and reaction temperature should be decided in accordance with the reduction method to be used. In general, it is preferable to employ a solvent such as water, methanol, ethanol, dimethylformamide, dimethylacetoamide or dioxane.

The reduced compound can be isolated and purified by a conventional method.

8,10-diaza-1-hydroxymethyl-6-hydroxy-5-methyl-2-oxa-bicyclo[4,2,2]decan-7,9-dione (VII), obtained by the method of this invention, is useful as a intermediate for preparing compound having pharmaceutical activities against microorganisms.

The present invention is illustrated by the following examples but not limited thereto.

EXAMPLE 1

9.06 g of bicyclomycin were dissolved in 100 ml of water and the solution was shaken with 0.4 g of $Pt_2O$ in hydrogen atmosphere at ambient temperature for an hour.

After the reaction was completed, the catalyst was removed by filtration and the filtrate was lyophilised. The residue was recrystallized from a methanol-ethyl ether mixture to give 6.2 g of dihydrobicyclomycin in the form of colorless prisms.

M.P.: 191°–192°C

Analysis for $C_{12}H_{20}O_7N_2$:
Calculated: C 47.36%, H 6.63%; N 9.21%.
Found C 47.21%; H 6.74%; N 8.95%.

EXAMPLE 2

3.02 g of bicyclomycin were dissolved in 40 ml of water and to the solution 5.57 g of periodic acid were added, while stirring at 0°C for 3 hours. An anion exchange resin, "Amberlite" IR-45 ($OH^-$ form), (Amberlite is a registered trademark) was added to thus treated solution for neutralization, and the solution was filtered and then the filtrate was washed. The filtrate was evaporated to dryness in vacuo to give 8,10-diaza-1-formyl-6-hydroxy-5-methylene-2-oxa-bicyclo[4,2,2]decan-7,9-dione in the form of anamorphous powder. The object compound was confirmed as follows.

The methylhemiacetal obtained by treating the object compound with methanol, was physicochemically confirmed.

Yield: 0.5 g
M.P.: >300°C

Analysis for $C_{10}H_{14}O_6N_2$:
Calculated: C 46.55%: H 5.47: N 10.86: $CH_3O$ 12.02.
Found: C 46.53%: H 5.56: N 10.63: $CH_3O$ 11.95.

Infra-red absorption spectrum (nujol):
$\nu_{max}$: 3400, 3280, 1675 cm$^{-1}$

Nulear magnetic resonance spectrum (in $d_6$-DMSO solution):

| $\tau$ (ppm) | |
|---|---|
| 7.06 | (multiplet, 2H) |
| 6.70 | (singlet, 3H) |
| 6.30 | (multiplet, 2H) |
| 5.32 | (doublet, 1H, J=8.0 HZ) |
| 4.95 | (singlet, 1H) |
| 4.63 | (singlet, 1H) |
| 3.49 | (doublet, 1H, J=8.0 HZ) |
| 3.20 | (singlet, 1H) |
| 2.00 | (singlet, 1H) |
| 1.15 | (singlet, 1H) |

2,4-Dinitrophenyl hydrazone of 8,10-diaza-1-formyl-6-hydroxy-5-methylene-2-oxa-bicyclo[4,3,2]decan-7,9-dione:

Yellow needles
M.P.: 230° – 231°C (decomposed)

EXAMPLE 3

3.4 g of monoacetate of bicyclomycin were dissolved in 50 ml of water and to the solution 2.75 g of periodic acid was added.

Methyl hemiacetal of 8,10-diaza-1-formyl-6-hydroxy-5-methylene-2-oxa-bicyclo[4,2,2]decan-7,9-dione was obtained by substantially the same procedures as described in Example 2. Infrared spectrum of this object compound is identical with that of the methyl hemiacetal obtained in Example 2.

EXAMPLE 4

0.3 g of the methylhemiacetal of 8,10-diaza-1-formyl-6-hydroxy-5-methylene-2-oxa-bicyclo[4,2,2]decan-7,9-dione were dissolved in 20 ml of methanol and the solution was shaken with 0.05 g of $Pt_2O$ in hydrogen atomosphere at ambient temperature for 7.5 hours. Crude product obtained was recrystallized from a ethanol to give 0.2 g of 8,10-diaza-1-hydroxymethyl-6-hydroxy-5-methyl-2-oxa-bicyclo[4,2,2]decan-7,9-dione in the form of colorless crystals.

M.P.: 198° – 199°C (decomposed) Mass spectrum: M$^+$ 230.09 ($C_9H_{14}O_5N_2$) Infra-red spectrum (nujol):
$\nu_{max}$: 3400, 3220, 3110, 1695 cm$^{-1}$
Nuclear magnetic resonance spectrum (in $D_2O$):

| $\tau$ (ppm) | |
|---|---|
| 8.95 | (doublet, 3H, J=6.6 HZ) |
| 8.10 | (multiplet, 2H) |
| 7.70 | (multiplet, 1H) |
| 6.36 | (doublet, 1H, $J_{AB}$=11.0 HZ) |
| 6.10 | (multiplet, 2H) |
| 6.01 | (doublet, 1H, $J_{AB}$=11.0 HZ) |

We claim:
1. A compound of the formula:

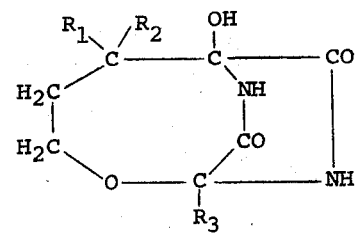

wherein $R_1$ and $R_2$ are linked together to form methylene or $R_1$ is hydrogen and $R_2$ is methyl; $R_3$ is formyl, hydroxymethyl, $-CH(OH)-C(OH)(CH_3)-CH_2OH$, or $-CH(OH)OR_4$ in which $R_4$ is hydrogen or a lower alkyl group, with the proviso that when $R_3$ is $-CH(OH)-C(OH)(CH_3)-CH_2OH$, $R_1$ is hydrogen and $R_2$ is methyl.

2. A compound according to claim 1, wherein $R_1$ is hydrogen and $R_2$ is methyl, and $R_3$ is $-CH(OH)-C(OH)(CH_3)-CH_2OH$.

3. A compound according to claim 1, wherein $R_1$ and $R_2$ are linked together to form methylene, and $R_3$ is formyl.

4. A compound according to claim 1, wherein $R_1$ and $R_2$ are linked together to form methylene, and $R_3$ is $-CH(OH)OR_4$ in which $R_4$ is lower alkyl group.

5. A compound according to claim 1, wherein $R_1$ and $R_2$ are linked together to form methylene, and $R_3$ is $-CH(OH)OR_4$ in which $R_4$ is hydrogen.

6. A compound according to claim 1, wherein $R_1$ is hydrogen and $R_2$ is methyl, and $R_3$ is hydroxymethyl.

7. A compound according to claim 4, wherein $R_1$ and $R_2$ are linked together to form methylene, and $R_3$ is $-CH(OH)OR_4$ in which $R_4$ is methyl.

* * * * *

UNITED STATES PATENT OFFICE
CERTIFICATE OF CORRECTION

Patent No. 3,873,526      Dated March 25, 1975

Inventor(s) Takashi Kamiya et al.

It is certified that error appears in the above-identified patent and that said Letters Patent are hereby corrected as shown below:

On title page, inventor "Masahi Hashimoto" should read --Masashi Hashimoto--;

Column 1, line 63, "bicyclot" should read --bicyclo--.

Signed and Sealed this twenty-fifth Day of May 1976

[SEAL]

Attest:

RUTH C. MASON
Attesting Officer

C. MARSHALL DANN
Commissioner of Patents and Trademarks